UNITED STATES PATENT OFFICE.

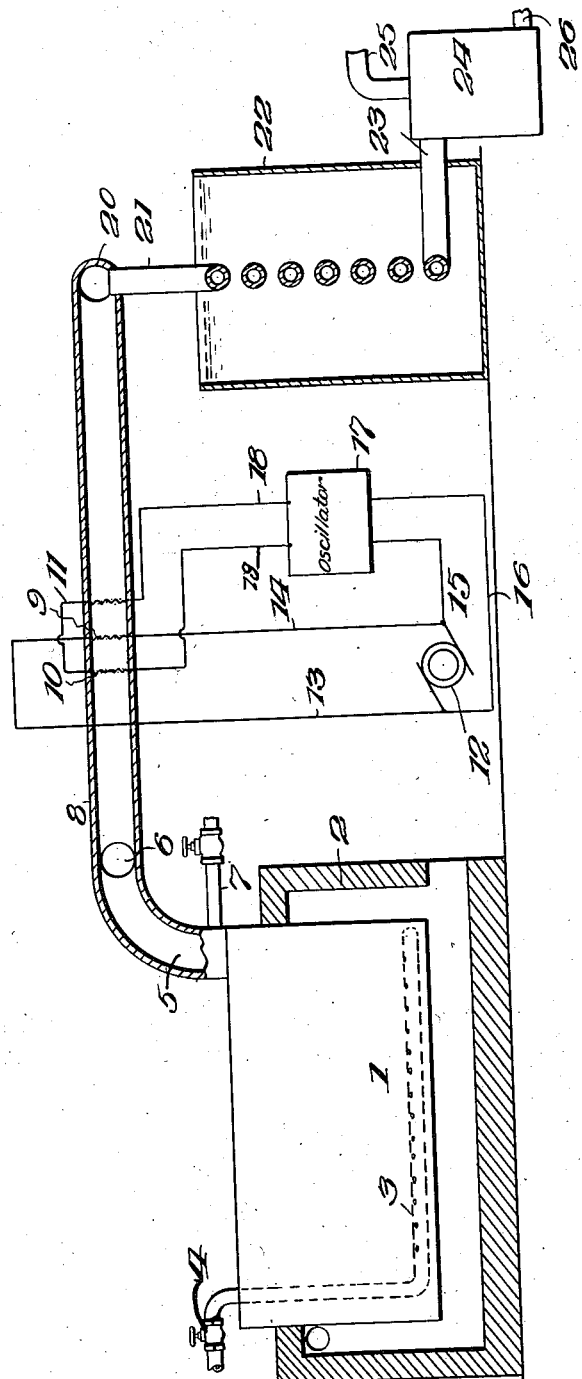

ELBRIDGE W. STEVENS, OF BALTIMORE, MARYLAND, ASSIGNOR TO CHEMICAL FUEL COMPANY OF AMERICA, INC., OF LOUISVILLE, KENTUCKY, A CORPORATION OF DELAWARE.

PROCESS OF CATALYSIS.

1,374,119.  Specification of Letters Patent.  Patented Apr. 5, 1921.

Application filed March 18, 1920. Serial No. 366,840.

*To all whom it may concern:*

Be it known that I, ELBRIDGE WEBSTER STEVENS, a citizen of the United States, residing at Baltimore, in the State of Maryland, have invented certain new and useful Improvements in Processes of Catalysis, of which the following is a specification.

This invention relates to processes of catalysis; and it comprises a method of maintaining clean surfaces and effective catalytic action of metal catalytics, such as nickel, iron, cobalt, etc., employed for effecting changes in carbon-containing gases and vapors at temperatures and under conditions where carbon would normally deposit wherein such catalysts during operation are bombarded by sparks from a source of high tension, rapidly oscillating alternating current; and more particularly it comprises a process of converting higher boiling oils into lower boiling oils by the action of heated metallic catalysts wherein the vapors of the oil to be converted, with or without admixed hydrogen-rich gas, are exposed to such a catalyst, the catalyst being bombarded with sparks of high tension oscillating current; all as more fully hereinafter set forth and as claimed.

Many metals in a heated state exercise what is known as a catalytic action upon carbon compounds in the state of gas or vapor; aiding or initiating various chemical reactions at the expense of such carbon compounds. Nickel, iron, cobalt, platinum, palladium, molybdenum, tungsten, etc., exercise such actions. In all cases, however, where catalytic actions upon hot gases or vapors containing carbon are concerned there is a tendency of these catalysts, and particularly with those of the nickel class, to cause separation and deposition of carbon. Frequently the catalyst rapidly becomes clogged with separated carbon, thereby losing effectiveness. In various commercial processes of producing hydrogen from water vapor or steam, this is done with the aid of carbon monoxid. Carbon monoxid is oxidized to carbon dioxid by $H_2O$ with production of $H_2$; and this action is much facilitated by presence of a catalytic metal; generally nickel, cobalt or iron. But there is also another reaction which is induced by these catalytic metals; the conversion of $2CO$ into $CO_2$ and C; this C being deposited in or on the catalyst. Consequently in these commercial methods for producing hydrogen there is the risk of this side reaction taking place and the catalyst becoming clogged with C. Commercial water gas, which is substantially a mixture of equal parts of CO and $H_2$, can be converted by nickel, etc., into a mixture of 2 parts by volume of $H_2$ with 1 part of $CO_2$. As the $CO_2$ is easily removed from the mixture, this is a cheap method of making hydrogen. But in catalyzing steam-water gas mixtures by nickel or the like in the manner described, there is always this tendency toward the deposition of carbon; and this carbon rapidly clogs up the nickel and lessens its catalytic activity. Hydrocarbon vapors and gases are also much affected by these catalytic metals; the result varying with conditions. But there is always a tendency, as with CO, for the molecular rearrangement to go forward in such a manner as to deposit solid carbon. This effect has rendered commercially impractical many otherwise desirable methods for catalytic conversion of hydrocarbons. For example, in the conversion of high boiling complex hydrocarbons into simpler and lower boiling hydrocarbons (making gasolene from gas oil, etc.) by heat, the action is much facilitated and regulated by the presence of metals, such as nickel. But this facilitating action is more or less short lived; the catalytic metal rapidly soots up and goes out of action.

I have found that the deposition of carbon on the catalytic metal, or sooting up, in these actions can be obviated by the simple expedient of showering the catalyst with high tension sparks; that is, by placing the catalyst in circuit with a source of high potential rapidly oscillating alternating current; the catalyst forming one electrode and another electrode being located within sparking distance thereof. Or the catalyst may be made an intermediate electrode between two other electrodes connected to the terminals of the source of high potential oscillating current. With this arrangement the active surface of the catalytic metal is bombarded with high potential sparks and is thereby kept clean and effective. The action of the sparking in this relation is not merely to remove carbon which deposits—it prevents the formation of carbon. In other words, in reactions which would normally cause a deposition of carbon, the carbon does not deposit. An electric discharge of this nature in addition has certain catalytic actions; and it may be, and very likely is, that the result I attain is, so to speak, a compound one: that it is in part due to the hot catalytic metal and in part to the fact that this hot catalytic metal is receiving and emitting sparks. I do not, however, wish to limit myself to any theory and merely record the discovery that a useful effect is attained by the combination of a hot catalyst and a spark discharge in this relation.

The stated invention may be usefully applied in the manufacture of hydrogen from blue gas or water gas. In so doing, the blue gas, admixed with a suitable volume of steam, is passed through a nickel (cobalt, iron, etc., may be used) screen or diaphragm of wire netting or perforated metal. This diaphragm is maintained at a suitable temperature for effecting the catalytic reaction desired, which in this case would be about 400° C. Any suitable source of heat may be employed; but it is convenient to use a heating current of low voltage and high amperage. In this particular case, nickel is highly desirable as combining the good catalytic qualities with a good power factor. During the discharge of the gas-steam mixture a sparking discharge is maintained between the nickel diaphragm, acting as one electrode, and another electrode. The sparks should be between the catalytic surface of the nickel and the other electrode. A convenient arrangement is to place a diaphragm of nickel wire cloth in a tube of suitable material, the diaphragm being connected to a suitable source of heating current. On each side of the nickel diaphragm, and within sparking range thereof, is located a sparking diaphragm of wire cloth made of nickel or aluminum. These electrode diaphragms are not connected to the heating current. I find suitable for the present purposes a sparking current of say 10,000 to 20,000 volts and, say, 100,000 frequency. The electrode diaphragms may be located an eighth of an inch or so from the catalytic diaphragm septum. Under these conditions the blue gas is smoothly and cleanly converted into a mixture of carbon dioxid and hydrogen without deposition of carbon. The nickel catalyst remains clean and bright and does not soot up. Not only is its period of activity indefinite but its activity is much increased. The catalyzed gases coming past the catalyst may be treated in any of the well known ways for removing the carbon dioxid from the hydrogen. By the use of the described method of producing hydrogen a relatively small apparatus is capable of producing a great volume of catalyzed gases and of continuing in operation indefinitely. There is not the usual necessity of regulating conditions " to keep the catalyzer alive." The process is much simplified.

In another embodiment of my invention in catalyzing oil vapors for the production of low boiling oil (gasolene), I keep the catalyzer alive and in operation in the same manner. As is well known, oil vapors subjected to a high temperature, say, 700 to 800° F., undergo internal rearrangement with production of lower boiling oils; this fact being the basis of the ordinary "cracking" processes. It is also known that this action is facilitated and made much more regular by catalytic metals; the production of lower boiling oils, under proper conditions, being much increased. Unfortunately, all the active catalytic metals in contact with oil vapors in this range of temperatures tend to break up the vapors with production of carbon. In other words, they soot up or coke up. But by sparking the catalyst, decomposition of the vapors in this manner is prevented. In operating under my invention, hot oil vapors coming from a still are passed through a tube of suitable material containing one or more wire gauze diaphragms of catalytic metal across it. These diaphragms may be heated electrically or otherwise to a temperature of, say, 300 to 450° C. In breaking down kerosene I prefer a temperature of about 425° C. (800° F.), while for breaking down vapors of gas oil a temperature of 370° C. (700° F.) is suitable. The catalytic diaphragm is bombarded with sparks from another diaphragm within sparking distance. Under these conditions, the hot diaphragm does not coke up and lose its activity; its surface keeps clean and retains its high catalytic power. In thus operating, the oil vapors passing the heated catalyst are converted into lower boiling bodies with a large yield and without deposition of much, if any, carbon. The yield of low boiling bodies (gasolene) may be enhanced by admixing hydrogen or a hydrogen-rich hydrocarbon, such as natural gas, with the oil vapors. In most oils and distillates suitable for furnishing gasolene, the ratio of carbon to hydrogen is rather larger than is desirable in gasolene and low boiling oils used for motor fuel. By using in admixture with the oil vapors a certain amount of hydrogen or a gas rich in hydrogen, the yield of low boiling oils may be enhanced and the quality of this oil may be improved.

In a good embodiment of my invention as regards the manufacture of low boiling oils suitable for motor use, I heat a body of gas oil or the like in a still and pass through the still a regulated current of natural gas or hydrogen. There may be about one or two cubic feet of natural gas used for each gallytic metal exposed to the vapors and kept clean and active by the sparks from 10 and 11, it will be mainly low-boiling material and will be in large part of saturated character. With an active spark discharge upon the surface of a relatively small diaphragm, very large quantities of oil vapor can be converted; in other words, the speed of passage of the oil vapor past the catalyst may be quite rapid. As the catalytic metal 9, perforated metal plates may be used, but ordinary wire cloth of fairly fine mesh is better. Ordinarily, nickel is more active than iron or cobalt for the present purposes and requires a less temperature to produce the same amount of action.

Instead of maintaining the catalytic metal as a pervious diaphragm spanning a tube or conduit and sparking the surface of this diaphragm, the catalytic metal can be of course otherwise arranged. The main object of the present invention is to keep the surface of the catalytic metal, whatever that surface may be, active and clean by high tension sparks directed against it under conditions where otherwise there would be a deposition of carbon. But the described arrangement of a simple diaphragm between two sparking electrodes, I consider the most advantageous. By locating the catalytic diaphragm between two sparking diaphragms, both surfaces are kept clean, the catalytic metal diaphragm acting as an intermediate electrode.

What I claim is:—

1. In the catalysis of gaseous or vaporous carbon compounds by hot metal catalysts maintained at temperatures and under conditions where carbon would normally deposit, the process which comprises sparking the surface of such catalyst during its period of operation.

2. In the catalytic production of reaction between gaseous or vaporous carbon compounds and other gaseous or vaporous substances by hot metallic catalysts maintained at temperatures and under conditions where carbon would normally deposit, the process which comprises sparking the surface of such catalyst during the period of its exposure to the mixture of gases or vapors.

3. In the production of lower boiling hydrocarbon oils from higher boiling oils by the action of heat and a catalytic metal on vapors of such higher boiling oils, the process which comprises sparking the surface of such catalytic metal during its period of operation.

4. In the production of lower boiling hydrocarbon oils from higher boiling oils the process which comprises exposing a mixture of vapors of such higher boiling oils with a hydrogen rich gas to the action of a hot catalytic metal and during such exposure sparking the surface of said catalytic metal.

5. In the production of lower boiling hydrocarbon oils from higher boiling oils the process which comprises exposing a mixture of vapors of such higher boiling oils with natural gas to the action of a hot catalytic metal and during such exposure sparking the surface of said catalytic metal.

6. In the production of low boiling oils suitable for motor fuel purposes from higher boiling petroleum oils, the process which comprises distilling said higher boiling oil to produce hot vapors, passing such vapors through a pervious diaphragm of catalytic metal at a somewhat higher temperature and during such passage exposing the surface of such diaphragm to a high-tension spark discharge.

7. In the production of low boiling oils suitable for motor fuel purposes from higher boiling petroleum oils, the process which comprises distilling said higher boiling oil to produce hot vapors in admixture with a hydrogen-rich gas, passing the mixture of gas and vapors through a pervious diaphragm of catalytic metal at a somewhat higher temperature and during such passage exposing the surface of such diaphragm to a high-tension spark discharge.

8. In the production of low boiling oils suitable for motor fuel purposes from higher boiling petroleum oils, the process which comprises distilling said higher boiling oil to produce hot vapors in admixture with natural gas, passing the mixture of gas and vapors through a pervious diaphragm of catalytic metal at a somewhat higher temperature and during such passage exposing the surface of such diaphragm to a high-tension spark discharge.

9. In the production of low boiling oils suitable for motor fuel purposes from high boiling petroleum oils the process which comprises passing vapors of high-boiling oils through a pervious diaphragm of catalytic metal maintained at a temperature between 600 and 800° F. and during such passage subjecting the surface of such diaphragm to a high tension spark discharge.

In testimony whereof, I affix my signature hereto.

ELBRIDGE W. STEVENS lon of oil distilled. Using hydrogen, about three-quarters of a cubic foot may be used for each gallon of oil. These proportions depend considerably upon the character of the oil used—the richer it is in carbon, the more hydrogen-rich gas should be used. With the stated amount of gas, distillation takes place at about 550° F. with a gas oil normally boiling at 600° F. The mixture of gas and oil vapors is passed through a tube of suitable material (iron may be used) containing one or more electrically heated nickel diaphragms. The diaphragm may be made of tolerably fine mesh, say, 100 mesh or the like. There may be a plurality of these diaphragms. Each diaphragm is heated to, say, 700° F. (370° C.) by a suitable heating current; say, 110 volts and 200 amperes. Before and behind each of these heated catalytic diaphragms, I arrange another diaphragm which may be also of nickel or may be of aluminum. The nature of the metal for these sparking diaphragms is not very material. I do not ordinarily heat these diaphragms and they do not exercise much catalytic action for this reason. They may, of course, like the catalytic diaphragm, be heated by a heating current: but ordinarily I think it advantageous to heat merely the intermediate diaphragm, using the other diaphragms merely as electrodes for the sparking current. This arrangement of neighboring diaphragms in close proximity to an intermediate heated diaphragm has the advantage of saving energy, since they intercept and return to the intermediate diaphragm much of the heat which it would otherwise lose by radiation. The sparking diaphragms are connected to the terminals of a step-up converter delivering current at ten to twenty thousand volts and of about one hundred thousand frequency. The amount of current required for sparking is very small. Under these conditions most of the methane or hydrogen disappears. The mixture of vapors and gases passing the catalyzer is cooled in condensers of the usual type employed in oil distillation, yielding a condensate containing a large proportion of easily volatile liquid hydrocarbons suitable for motor purposes. The uncondensed gases (in using a mixture of natural gas and oil vapors) are generally quite rich in unsaturated hydrocarbons; largely ethylene.

In the accompanying illustration I have shown, more or less diagrammatically, apparatus capable of use in the performance of the described process. In this showing the figure is a central vertical section with certain parts showing in elevation. No attempt has been made to preserve relative proportions of parts, certain parts being shown on exaggerated scale for the sake of clearness.

In this showing, element 1 is an ordinary oil still set within furnace housing 2 in an ordinary way. Within the still is perforated pipe 3 of the ordinary type used for delivering bottom steam into a still. It may here be used for delivering steam, for delivering natural gas or for delivering hydrogen. Adjustment of the supply of fluid through this pipe is by valve 4. Leading from the still is vapor outlet 5 which may be connected with the diagrammatically shown manifold or header 6. Leading into the vapor outlet pipe is valved pipe 7 which also may be used for injecting hydrogen-rich gases. Passing beyond the header is catalyzer tube 8, shown on an enlarged scale. Spanning this tube is a wire cloth diaphragm 9 made of catalytic metal, such as nickel, iron or cobalt. Adjacent to it and on one side is sparking diaphragm 10 and on the other side is sparking diaphragm 11. In practice these sparking diaphragms are very close to the catalytic diaphragm, although they are shown as spaced some distance away for the sake of clearness. Source of low tension alternating heating current 12 supplies the catalytic diaphragm through leads 13 and 14. Branching from these leads are feed wires 15 and 16, supplying an oscillator 17. Stepped-up current at high voltage leaves the oscillator through 18 and 19 which are connected to the two sparking electrodes. There may be several such arrangements of two sparking electrodes and an intermediate heating catalytic diaphragm in the tube. The vapors passing this arrangement are catalyzed without deposition of carbon. Leaving the catalyst, the vapors or vapors and gases pass to header 20 connected to suitable condenser 21 in tube 22. Condensed vapors and permanent gases leave the condenser through 23, entering tank 24, whence gases escape at 25. Liquid is withdrawn at 26. Ordinarily, in using hydrogen or natural gas in admixture with the oil vapors, the gases leaving at 25, although small in amount, are of great heating value, being rich in unsaturated compounds; olefins, acetylene, etc. They may be burnt or utilized for chemical purposes.

The operation of the described apparatus is believed to be obvious from the foregoing. Either hydrogen or natural gas or any other gas rich in hydrogen may be supplied through 3. In addition to this gas, or instead of it, a small amount of steam may be used. Steam is also rich in hydrogen, but it of course produces oxidized compounds to greater or less extent.

As the oil used in still 1, any of the ordinary petroleum oils or distillates may be employed, as for instance, gas oil, solar oil, crude oil, still bottoms, etc. The character of the oily material recovered at 26 of course depends largely upon the speed of distillation; but with a sufficient surface of cata-